US012583558B2

(12) United States Patent
Papadopoulos et al.

(10) Patent No.: US 12,583,558 B2
(45) Date of Patent: Mar. 24, 2026

(54) METHOD AND APPARATUS FOR MAINTAINING ENERGY PRODUCTION IN AN OFFSHORE WIND FARM

(71) Applicants: Jeremy J Papadopoulos, Manchester (GB); Vincent Loccisano, Wellesley, MA (US)

(72) Inventors: Jeremy J Papadopoulos, Manchester (GB); Vincent Loccisano, Wellesley, MA (US)

( * ) Notice: Subject to any disclaimer, the term of this patent is extended or adjusted under 35 U.S.C. 154(b) by 413 days.

(21) Appl. No.: 18/451,628

(22) Filed: Aug. 17, 2023

(65) Prior Publication Data

US 2024/0059378 A1     Feb. 22, 2024

Related U.S. Application Data

(60) Provisional application No. 63/371,664, filed on Aug. 17, 2022.

(51) Int. Cl.
| | |
|---|---|
| *B63B 21/62* | (2006.01) |
| *B63B 21/50* | (2006.01) |
| *B63B 35/44* | (2006.01) |
| *B63B 79/40* | (2020.01) |
| *F03D 13/25* | (2016.01) |

(52) U.S. Cl.
CPC .............. *B63B 21/62* (2013.01); *B63B 21/50* (2013.01); *B63B 79/40* (2020.01); *F03D 13/256* (2023.08); *B63B 2035/446* (2013.01); *F05B 2230/80* (2013.01); *F05B 2240/93* (2013.01); *F05B 2240/95* (2013.01)

(58) Field of Classification Search
CPC .. B63B 3/00; B63B 3/08; B63B 35/00; B63B 35/38; B63B 21/62; B63B 2035/446
See application file for complete search history.

(56) References Cited

FOREIGN PATENT DOCUMENTS

| | | | | | |
|---|---|---|---|---|---|
| CN | 114162263 A | * | 3/2022 | ............. | B63B 35/44 |
| WO | WO-2009131826 A2 | * | 10/2009 | ............. | B63B 39/03 |

* cited by examiner

*Primary Examiner* — Timothy D Collins
*Assistant Examiner* — Justin Michael Heston
(74) *Attorney, Agent, or Firm* — Keeley DeAngelo LLP; W Scott Keeley

(57) ABSTRACT

An apparatus for generating offshore wind employs shallow draft floats supporting a lattice tower with a wide base having a single-line anchoring providing passive yawing. The lattice structure supports a horizontal shaft at both ends of the shaft for rotating a rotor assembly. Mechanical energy from the rotor may be transferred to electrical generation equipment located at the base of the structure.

4 Claims, 3 Drawing Sheets

METHOD AND APPARATUS FOR MAINTAINING ENERGY PRODUCTION IN AN OFFSHORE WIND FARM

TECHNICAL FIELD

The present disclosure relates in general to wind turbines and more specifically to offshore wind turbine structures that support turbine replacement and near-shore maintenance.

BACKGROUND

A wind turbine is a rotating machine that converts kinetic energy from wind into mechanical energy that is converted to electricity. Utility-scale horizontal-axis wind turbines have horizontal shafts that are commonly pointed into the wind by a shaft and generator assembly within a nacelle, at the top of a tower that is yawed relative to the tower in order to align the rotor with the wind. The nacelle commonly s-s a direct drive generator or a transmission and generator combination.

Wind turbines used for offshore applications commonly Aude single-tower systems mounted to the sea bed. Some float, using shallow submersible or semi-submersible platforms employing spars or spar buoys, tension legs, or a large-area barge-type construction. Offshore turbines are usually connected to a local power grid. Produced electrical energy is transferred and conditioned by grid structures.

Spars are ballasted, elongate structures that float at the water line, placing the center of gravity lower than the center of buoyancy. A spar is moored to the sea floor.

Tension-leg platforms are permanently moored by tethers or tendons grouped at each of the structure's corners. A group of tethers is referred to as a tension leg. The design provides relatively high axial stiffness such that virtually all vertical motion of the platform is eliminated.

A large-area barge or "buoyancy-stabilized platform" is a heavy floating structure, moored to the sea bed, supporting a vertical axis turbine. Jack-up barges, similar to oil and gas platforms, are used as a base for servicing other structures such as offshore wind turbines. The state of the art emphasizes platforms that are immobilized against wave disturbance by mass, mooring, ballast and the like.

Many offshore wind fields are up to 100 miles from shore, with turbines that are not intended to be moved. For ballast and stability, heavy floating structures tend to be deeply placed, ruling out high-speed towing to shallow waters for maintenance. On-site, offshore installation, maintenance and repair is far more expensive and time-consuming than similar tasks conducted on land or in a near-land facility.

When conducted offshore, installation, maintenance and repair of offshore turbines is far more expensive and time-consuming than that conducted on land or on a near-land facility.

SUMMARY

An apparatus for generating offshore wind energy is designed for passive yawing, employing shallow draft floats supporting a lattice tower with a wide base having a single-line anchoring. In some embodiments, dual-line anchoring may be used while still allowing passive yawing.

In an example embodiment, a lattice structure has four legs, each connected to a shallow float at the base. Each leg is joined at the top to a horizontal structure that is configured to support a wind-turbine rotor. The base of at least two of the lattice structure legs is connected to a V-shaped structure that is a mooring and towing point. The overall structure is an irregular pentagon with four vertices in a rectangular pattern, and a fifth vertex extending from the midpoint of two of the other vertices. The fifth vertex is configured with equipment appropriate to function as a mooring or towing point (it is also referred to as a hitch point). One skilled in the art is familiar with mooring points, towing apparatuses, and fifth wheels as used in towing and mooring. Mooring from a single point on the turbine lattice structure, in combination with shallow floats, allows the turbine to passively yaw into the wind, obviating the need for a mechanical yaw system in a nacelle. Shallow floats, in combination with a wide base and a single towing point, enable a turbine to be erected on or near land obviating the need for an ocean-based crane. The wide base may be used to accommodate a deck-level generator assembly with a belt drive, or the like, to the turbine rotor. One skilled in the art understands how mooring-line orientation, as described in the above example apparatus, may function to eliminate wind-thrust pitch or horizontal tower load as commonly occurs with monopole tower construction.

In an example embodiment, a turbine may be switched with one requiring maintenance or repair. In such a case, a tugged turbine is swapped with a moored turbine. A relatively small tug boat may be adapted to clasp the hitch point on a turbine to maneuver it to a mooring and again to clasp the hitch point of a turbine to be removed to tow it to land. One skilled in the art understands that electric connections would also be switched between the turbine being removed and the turbine being replaced. In some embodiments electric contacts are spring-energized and may be disconnected by way of a screw or pneumatic actuator. Mechanisms and devices for strain relief between cables and mooring lines are known in the art.

Shallow draft floats provide a low-cost solution that facilitates towing. To overcome the typical distance between shore and an offshore wind field, a towing speed close to 10 knots is necessary. The present disclosure describes innovations such as a broad base with shallow draft floats, a single towing/mooring point, and a low center of gravity to facilitate high-speed towing to land or shallow-water, near-land locations, for maintenance and repair. One skilled in the art understands that swapping out a turbine in a field is far more cost-effective than affecting repairs onsite.

In some embodiments, floats are hull-shaped to facilitate high-speed towing in less-than-optimal weather conditions. Other embodiments include hull-shaped adaptors that may be fitted to a shallow draft float for towing. One example includes adapters having fluid-dynamic forms that enable semi-planing of the floats to reduce drag while towing. Such adapters may include vertical, streamlined forms that are air-pressurized so as to raise the shallow draft floats above waves. One skilled in the art is familiar with inflatable hulls and streamlined forms.

In some embodiments, remote-controlled rudders or thrusters may be employed to orient the apparatus. In other embodiments, buoyancy may be controlled by partially inflating or deflating the shallow floats. In yet other embodiments blade-pitch tuning may be employed to negate wind-shadow loads.

DESCRIPTION

Figure 1:
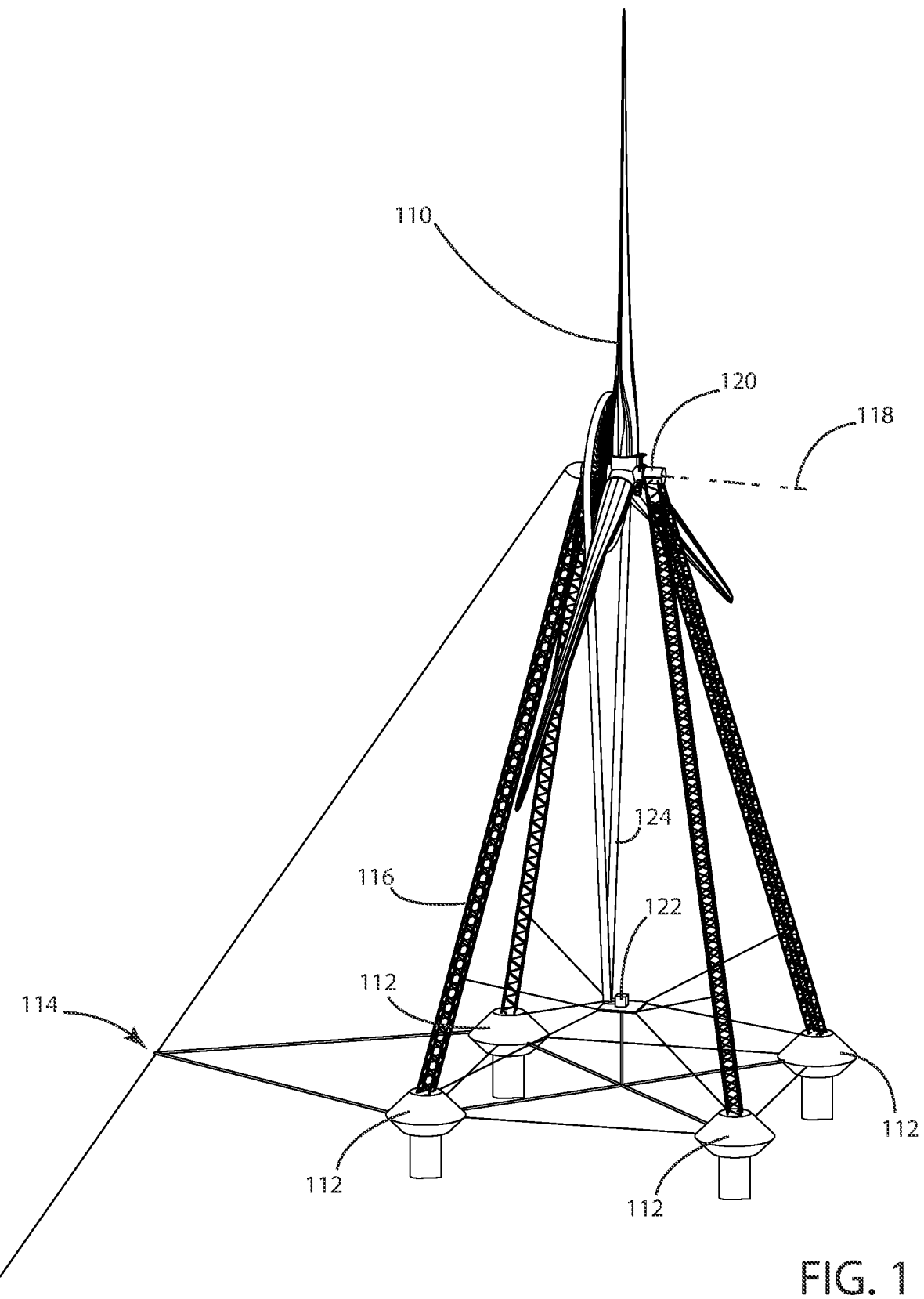
FIG. 1 is a perspective view of an example embodiment of the disclosure.

FIG. 1 shows example embodiment 100 in which a truss structure 116 is supported by shallow floats 112. Floats 112 are arranged in a rectilinear pattern. One skilled in the art understands that fewer than 4 shallow floats or more than 4 shallow floats 112 could also function to support a truss structure 116. In some embodiments, the overall structure includes four shallow floats 112 in a rectilinear pattern, further joined to a triangular structure that supports a mooring and towing point 114. A plan view of the structure (FIG. 3) shows an irregular pentagon with four vertices in a rectangular pattern and a fifth vertex 114 extending from the midpoint of two of the other vertices. When moored to the mooring/towing point 114 the turbine may passively yaw about the mooring point, obviating the need for a nacelle-based yaw mechanism.

The truss structure 116 supports a horizontal shaft 120 about which a turbine rotor 110 rotates. The structure 116 may be configured to support a shaft 120 at both ends. One skilled in the art understands the complexity of supporting a cantilevered shaft with a heavy rotor. In some embodiments, electrical-generation equipment is located on the base of the structure 126. Mechanical energy may be transferred from the rotor 110 to the electrical generation-equipment 122 by a drive mechanism 124. One skilled in the art understands that a drive mechanism 124 may be a belt, shaft, chain or the like. The overall structure obviates the need for a nacelle at the rotor axis 118, which obviates the need to perform high-altitude maintenance.

Figure 2:
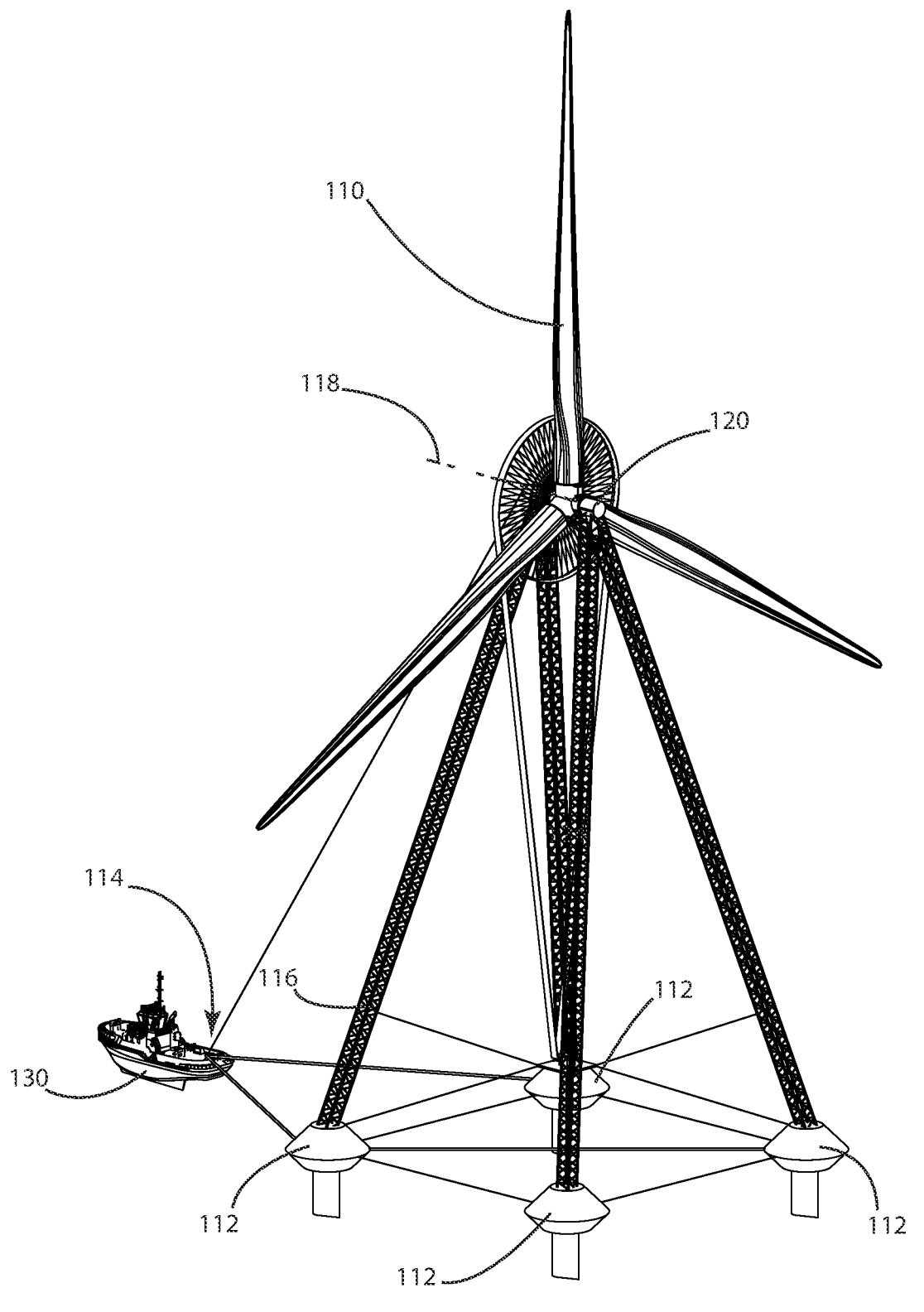
FIG. 2 is a perspective view of thereof.

FIG. 2 shows an example embodiment towed by a boat 130 at the embodiment's mooring/towing point 114. One skilled in the art understands that switching out a turbine in a field and towing a turbine to a land-based or near-land-based facility for maintenance or repair, greatly facilitates maintenance tasks while maintaining maximum power production from a turbine field. Additional reference numbers are shown for reference.

Figure 3:
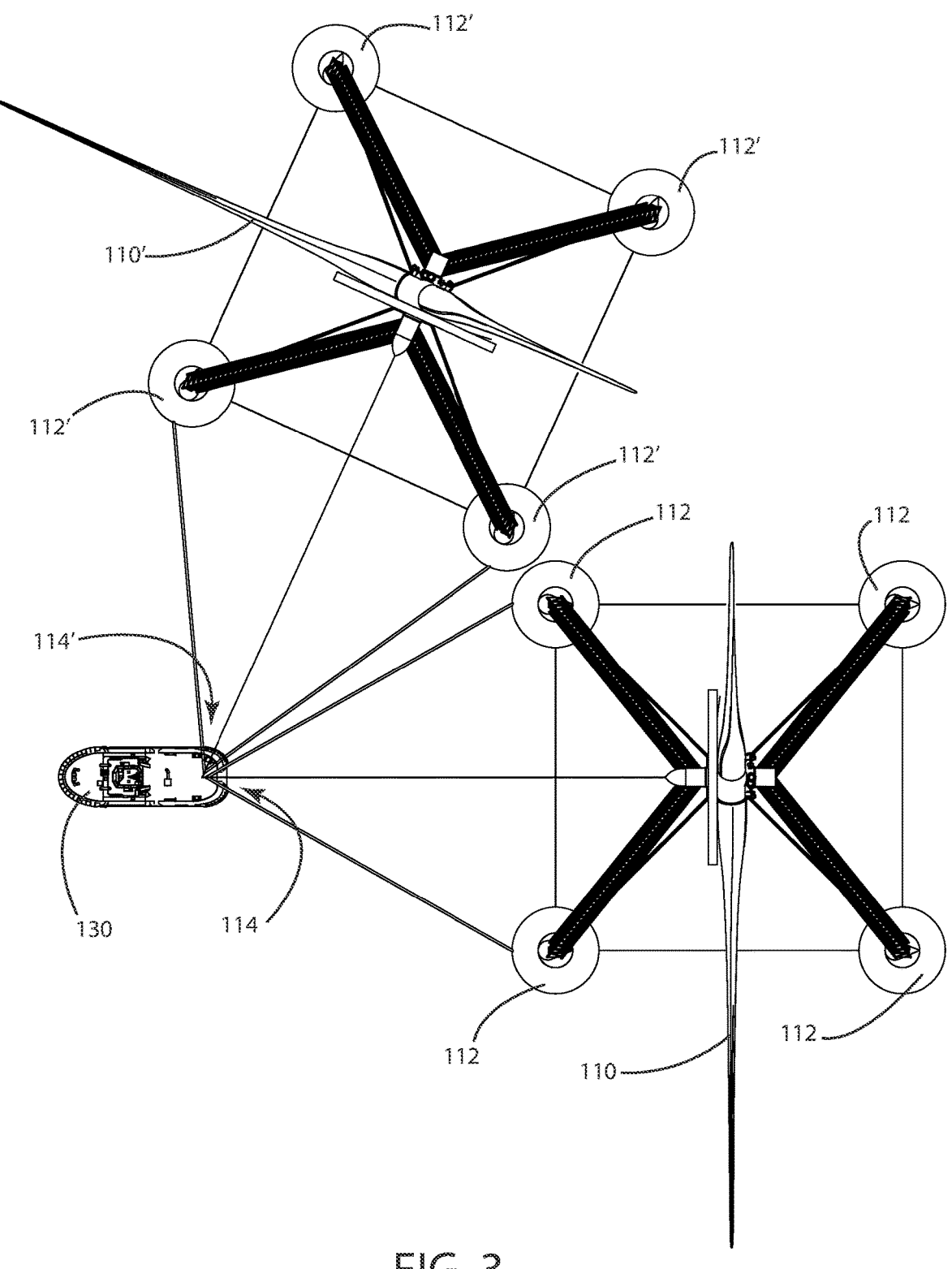
FIG. 3 is a plan view thereof.

FIG. 3 is a plan view depicting two turbines being replaced before towing one to a near-shore facility for maintenance. A mooring line is attached to a first turbine at the mooring/towing point 114. Both turbines are attached to the mooring point momentarily. The first turbine is removed and attached to a boat 130 for towing to a maintenance facility. In some embodiments a hitch point is an apparatus similar to a fifth-wheel used in the trucking industry. Rudders adapted to fit the turbine assist in moving the turbine once connected to the hitch point.

In some embodiments, electrical switchgear is mounted on the turbine structure and can suppress large currents in a power cable. In some embodiments the switchgear is operated remotely. One skilled in the art understands pneumatic, electric line or radio-signal-operated remote-switching technology. Other embodiments include an isolating switch below a cable connection to the turbine to enable safe switching. Strain relief in a cable may be achieved by pulling the turbine forward to slacken the line.

In an example switching operation, a tugged turbine is swapped with a moored turbine. A small boat 130 is adapted to clasp turbines to a hitch point 114 and move turbines about. In some embodiments, remote-controlled features include a remote-controlled mooring connection or removal, or remote-controlled rudders on wind turbine structures for straight-line towing or for rotation about the mooring point.

FIG. 3 depicts a boat 130 moving two turbines close together, joining float 112' to float 112. Then mooring point 114' is connected to mooring point 114. Mooring point 114 is then connected to a fifth-wheel on a boat 130. Structural lines between each turbine's mooring point and hub are lengthened so that hinged standoffs to the mooring point may move up and down with the local wave height. One skilled in the art understands that such standoffs may include a float near hitch point 114 to support hitch point 114 at a fixed height above the water elevation. This permits the boat to connect to points 114 and 114' simultaneously despite wave motions of each turbine and the boat. Once turbines are connected to each other and to the boat 130, the upper end of a mooring line can be loosened with a parallel strain-relieving winch and the mooring line may be lifted free of its hook and transferred to the receiver on the other turbine. Electrical connections are then transferred.

To facilitate quick towing, a turbine to be towed near to shore may be positioned over sunk air-cushion transporters, then winched onto land. One skilled in the art understands how a gin pole may be used to lift a turbine by its hub to move it to land. In other examples, a gantry crane may be erected near shore to assist in maintenance or movement to shore.

In an example scenario, each turbine is autonomously self-moving and self-connecting. Motors, propellers, rudders and a control unit enable simultaneous transport of more than one turbine to shore. In one example, all turbines in a field enter a protected anchorage and all are connected together to prepare for heavy weather.

In another example, automated boats, controlled from land, may be configured to move turbines, connect and disconnect electrical connections, and tow turbines to shore. To ease the switching of a mooring cable, it may be connected by a dovetail that allows horizontal sliding when not locked. Once a spare turbine is keyed to a moored turbine, hydraulic cylinders may push the mooring cable to the spare unit, even if the cable is still loaded.

The invention claimed is:

1. An offshore wind turbine comprising:
   a truss structure supported above a water surface by shallow draft floats; and
   a wind turbine supported atop said truss structure; and
   said shallow draft floats fixedly engaged with a rectangular frame, and arranged in a rectangular pattern having four straight sides; and
   a triangular frame having three straight sides, one side fixedly engaged and parallel with one straight side of said rectangular frame; and
   a hitch point on said triangular frame at the end of two of said three straight sides; and
   said hitch point removably engaged with a mooring apparatus; and
   electrical-production equipment electrically coupled with said wind turbine, and a first transmission line from said electrical production equipment to said hitch point; and
   said first transmission line removably engaged with a second transmission line that is electrically coupled to a land based electrical grid; wherein
   mooring said wind turbine from said hitch point allows the wind turbine to yaw passively and said wind turbine may be towed by said hitch point.

2. The offshore wind turbine of claim 1 further comprising:
   at least one hinge between said hitch point and said triangular frame; wherein said hinge mitigates movement from local wave height changes while maneuvering said hitch point.

3. The offshore wind turbine of claim 1 further comprising:

remote controlled mechanical connection between said hitch point and said mooring apparatus.

4. The offshore wind turbine of claim 1 further comprising:

a remote-controlled electrical connection between said first transmission line and said second transmission line.

* * * * *